May 11, 1943.  H. GRAY  2,318,992
TRACK FOR SELF-LAYING TRACK VEHICLES
Filed Feb. 5, 1941
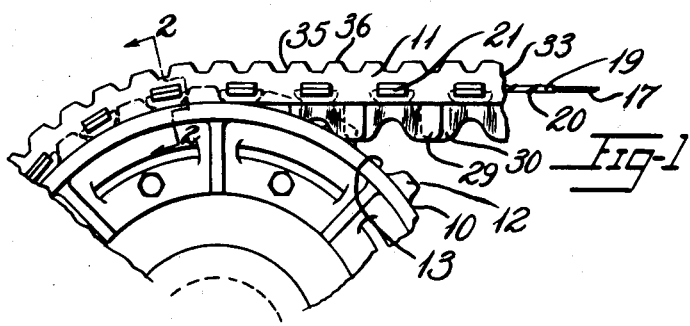
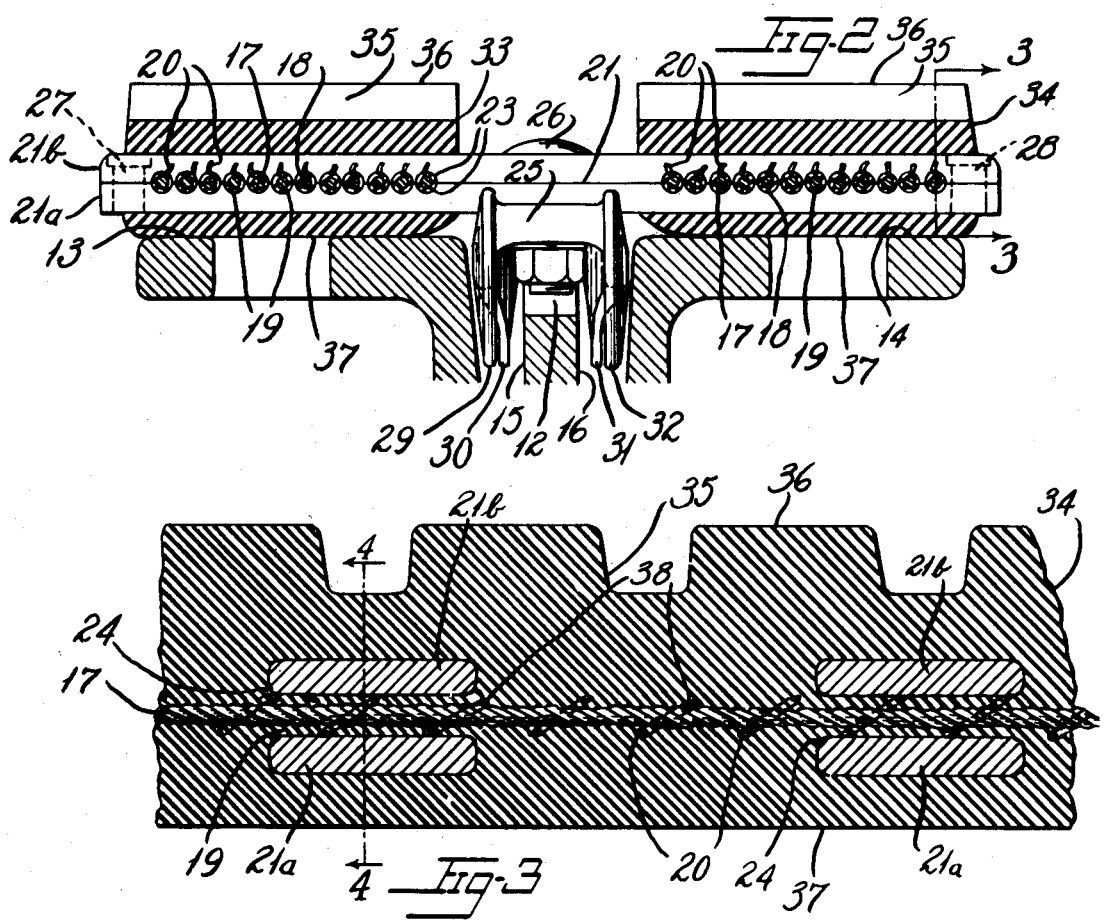
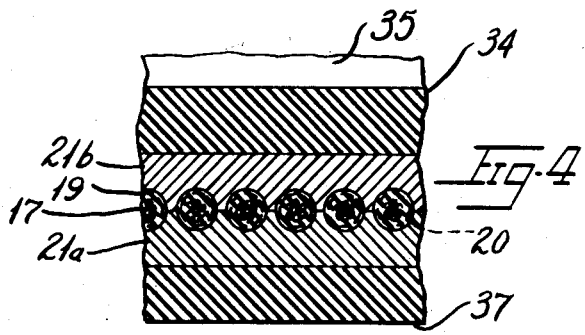
Inventor
Harold Gray
By Willis F. Avery
Atty Patented May 11, 1943

2,318,992

UNITED STATES PATENT OFFICE 2,318,992

TRACK FOR SELF-LAYING TRACK VEHICLES

Harold Gray, Akron, Ohio, assignor to The B. F. Goodrich Company, New York, N. Y., a corporation of New York Application February 5, 1941, Serial No. 377,417

14 Claims. (Cl. 305—10)

This invention relates to tracks for use with self-laying track vehicles and is especially useful in the manufacture of tracks having an insulating tread surface.

In the self-laying track type of vehicles, endless tracks of flexible but relatively non-stretchable construction are mounted about driving wheels or sprockets and guide pulleys or rollers so as to extend between the sprockets and pulleys and the ground to provide a track surface of great area which functions as a support for the vehicle and also as means to transmit the driving forces from the power plant of the vehicle to the ground to provide traction.

In some forms of such tracks proposed heretofore substantially non-extensible flexible tension members have extended longitudinally of the track and have been secured to cross-bars which transmit the driving forces from the sprockets to the tread of the track. In one form of such track the metallic cross-bars which take the driving force from the metal sprockets have been connected to the metallic cables which comprises the tension members by an intervening cushion of rubber or other rubber-like material which has transmitted the load from the cross-bars to the cables by shear distortion of the cushion material, and a tread of rubber or other rubber-like material has completely enclosed the cables to provide traction and to protect the cables from corrosion, only portions of the cross-bars being exposed. As the cross-bars have been electrically insulated from each other, cables have been completely insulated electrically from the cross-bars, and only those cross-bars having metal-to-metal contact with the sprockets at any instant have been electrically connected to the sprocket, charges of static electricity have been generated on the insulated metallic parts of the track and especially on the cross-bars so that their discharge has in some cases provided static disturbances of radio instruments carried by the vehicle.

The present invention aims to overcome the foregoing difficulties.

The principal objects of the invention are to provide for conducting away electrical changes from metallic parts of the track without interfering with the cushioning of the tension cables, to provide a multiplicity of available grounding contacts, to provide a high degree of cushioning of the cables, to provide simplicity of structure and efficiency of operation.

These and other objects will appear from the following description and the accompanying drawing.

Of the drawing:

Fig. 1 is a side elevation of a driving wheel and sprocket with a portion of a track constructed in accordance with and embodying the invention in position thereon, parts of the track and of the wheel being broken away.

Fig. 2 is a cross sectional view taken on line 2—2 of Fig. 1, part of the wheel being broken away.

Fig. 3 is a longitudinal sectional view of the track taken on line 3—3 of Fig. 2, parts being broken away.

Fig. 4 is a sectional view taken on line 4—4 of Fig. 3.

In accordance with the invention spaced-apart reaches of metallic cables comprising the tension members of the track are crossed at intervals by metallic cross-bars bonded thereto by vulcanization but separated therefrom by a substantial body of rubber-like cushioning material acting in shear to transmit the driving forces, and a body of cushioning tread material completely encloses the cables and partially encloses the bars, while electrically conductive members are associated with each cable and its insulating cushion, preferably disposed in helical fashion about the cable, and connect the bars to each other electrically while permitting free movement of the bars with relation to each other under stress of the cushioning material. By contact of the conductors at intervals with the cross-bars and the cables, all metallic parts may be electrically connected to each other to dissipate static charges.

Referring to the drawing, the numeral 10 designates one of the driving sprockets and the numeral 11 designates the flexible and substantially non-extensible endless track in operative relation thereto. The driving sprocket is formed with teeth 12 for driving the track and also with supporting surfaces 13, 14 for engaging the surface of the track. Annular grooves 15, 16 are also formed in the sprocket between the sprocket teeth and the surfaces 13, 14 for receiving guiding lugs of the track.

The driving track comprises a plurality of spaced-apart reaches 17, 18 of metallic cable. These reaches may be spaced-apart convolutions of a continuous cable or spaced-apart endless cables free from each other. Each cable is enclosed by a covering layer 19 of cushioning rubber or rubber-like material extending therealong and thereabout. An electrically conductive wire 20 of metal is wrapped about each cable and its enclosing cushion covering layer 19 preferably in a helical winding of so great a pitch as to overlie only a small area of the covering layer, leaving the layer exposed for adhesion to the tread and to the cross bars, while of short enough pitch as to make more than one convolution within the span of each cross bar to provide a plurality of points of contact therewith. Such long pitch of the wires materially reduces impedance of the conductors due to inductance thereof.

The cables are resiliently held in spaced relation, and the driving load is transmitted thereto by a series of spaced-apart cross-bars 21 each of which comprises a pair of bar members 21a, 21b, secured to each other face to face and arranged on opposite faces of the span of cables. These bar members are formed on their opposed faces with spaced-apart complementary grooves 23 preferably of half-round cross-section adapted to engage the cushion covering layers about the spaced cables and to hold the cables in spaced-apart relation, while also contacting with the wire 20. The end of the grooves 23 are well rounded or chamfered, as at 24, to prevent objectionable pinching of the cushion layer 19 and the wire 20 when the cables are flexed by bending of the track around the sprockets.

Removable wear plates 25 are attached to the cross-bars 21, in electrical contact therewith, as by bolts 26 which also pass through the bar members 21a, 21b, to clamp them together. Additional bolts 27, 28, are provided to secure the ends of the bar members 21a, 21b, to each other and pass through openings therein for this purpose. The wear plates contact with the sprocket teeth 12 and are formed with overlapping guide flanges 29, 30, 31, 32, which act to prevent side sway of the track by their overlapping engagement and cooperate with the sprocket grooves 15, 16 in guiding the track. The cross-bars are preferably so constructed that two sets of spaced cables are associated therewith at opposite ends of the bars and each set of cables is completely enclosed by a tread body 33, 34 of rubber-like material which bodies are spaced apart from each other to provide an exposed portion of the cross-bars therebetween for receiving the wear plates 25. The spacing of the tread bodies from each other provides a continuous channel therebetween through which contact of the sprockets discharges accumulated earth.

The tread-bodies may be formed with any desired non-skid surface such as the grooves 35 and blocks 36 on their ground contacting faces while the wheel-contacting face 37 is preferably smooth.

All of the metallic parts which contact with the rubber-like cushioning and protecting material are vulcanized thereto and for this purpose may be coated with material such as an electro-deposit of a copper zinc alloy to promote adhesion.

In the manufacture of the track the cables 17, 18, are treated as by brass plating, cementing or otherwise to promote adhesion and are then given a covering layer of rubber or other rubber-like material. This covering is preferably applied by extrusion of the rubber-like material about the cable as by use of an insulating head on an extruding machine and provides the cushion layer 19. The wire conductor 20 is wound on the cable over the layer 19, the layer 19 being cooled to prevent the wire from being generally drawn through the layer 19 into contact with the cable although this may occur occasionally as at 38 and provides a ground contact at such positions. The cross-bars are also treated as by electro-plating and cementing with a rubber cement to provide adhesion to the cushioning material, and are then assembled on the covered cables at the desired spaced-apart positions. The rubber-like material comprising the tread bodies is then assembled about the cables and bars and the entire track is placed in a mold where heat and pressure are applied to vulcanize the rubber-like material. The wear plates 25 are then bolted to the cross-bars. During assembly and vulcanization, the wire conductor 20 becomes embedded in the rubber-like material but is forced into contact with the cross-bars and in some positions is forced into contact with the cables but the wire does not interfere with the cushioning of the cross-bars from the cables as its diameter is small as compared to the space between the cables and the cross-bars, and its helical form permits relative movement of its convolutions and extension of the entire conductor.

The invention provides for grounding of all the metal parts from which sparking may occur as the conductive wire is grounded on all the cross-bars and one of the cross-bars is always in contact with the driving sprocket, while, at the same time, the helical disposition of the conductive wire permits such relative movement of the cross-bars with relation to each other as is provided by the cushioning layer of rubber-like material between the cables and the cross-bars and acting under shear in transmitting the driving forces from the cross-bars to the cables. As the number of cables is considerable as is also the number of cross-bars, and the conductors make a great many turns around each cable, the chance of all metal parts being electrically connected to each other is relatively great without special care to establish a ground between the wire and the cable although the wire may be attached to the cable at certain positions by baring the cable at such positions between cross-bars and wrapping the wire directly over such bared areas. Grounding of the cables is usually, however, unnecessary as where the cables are completely insulated from the sprockets no such discharge from the cables occurs as to cause radio interference.

Variations may be made without departing from the scope of the invention as it is defined by the following claims.

I claim:

1. A track for a self-laying track vehicle, said track comprising a body of rubber-like material, spaced-apart members associated therewith and adapted to engage a relatively movable member, load-transmitting means connecting said spaced-apart members, and conductive means additional to the load-transmitting means of the track between said spaced-apart members for reducing electrical charges thereon.

2. A track for a self-laying track vehicle, said track comprising a body of rubber-like material, spaced-apart cross members associated therewith and adapted to engage a relatively movable member, load-transmitting means connecting said cross members, and an electrical conductor of devious form additional to the load-transmitting means of the track connecting said cross members electrically.

3. A track for a self-laying track vehicle, said track comprising a body of rubber-like material, spaced-apart cross members associated therewith and adapted to engage a relatively movable member, load-transmitting means connecting said cross members, and a helically coiled conductor additional to the load-transmitting means of the track connecting said cross members electrically.

4. A track for a self-laying track vehicle, said track comprising a longitudinal tension member, a cross member associated with said tension member and separated therefrom by a cushion of resilient rubber-like material, and electrically conductive means between said tension member and said cross member.

5. A track for a self-laying track vehicle, said track comprising a longitudinal tension member, spaced apart cross members along said tension member, the cross members being in spaced-apart relation to said tension member and having interposed rubber-like material providing a cushioned driving connection between them, and flexible electrically-conductive means between said tension member and said cross members and electrically connecting said cross members to each other.

6. A track for a self-laying track vehicle, said track comprising a longitudinal tension member, spaced-apart cross members along said tension member, the cross members being in spaced-apart relation to said tension member and having interposed rubber-like material providing a cushioned driving connection between them, and flexible, electrically-conductive means in said rubber-like material between said tension member and cross members.

7. A track for a self-laying track vehicle, said track comprising a longitudinal tension member, spaced-apart cross members along said tension member, the cross members being in spaced-apart relation to said tension member and having interposed rubber-like material providing a cushioned driving connection between them, and a flexible electrically-conductive element of devious form connecting said tension member and said cross members.

8. A track for a self-laying track vehicle, said track comprising a longitudinal tension member, spaced-apart cross members along said tension member, the cross members being in spaced-apart relation to said tension member and having interposed rubber-like material providing a cushioned driving connection between them, and a flexible helically disposed wire connecting said tension member and said cross members.

9. Apparatus for transmitting a driving force said apparatus comprising a driving member, a flexible driven member associated therewith and separated therefrom by a cushion of rubber-like material, and an extensible electrical conductor between said driving member and said driven member and effective to transmit an electrical charge from one to the other.

10. Apparatus for transmitting a driving force said apparatus comprising a driving member, a flexible driven member associated therewith and separated therefrom by a cushion of rubber-like material, and an electrical conductor of devious form connecting said driving member to said driven member and effective to transmit an electrical charge from one to the other.

11. Apparatus for transmitting a driving force said apparatus comprising a driving member, a flexible driven member associated therewith and separated therefrom by a cushion of rubber-like material, and an electrical conductor of helical form connecting said driving member to said driven member and effective to transmit an electrical charge from one to the other.

12. A track for self-laying track vehicles, said track comprising a flexible body structure comprising rubber-like material, metallic cables, and metallic cross-bars resiliently connected to said cables by interposed rubber-like material, for engaging a relatively movable member, and a helically disposed conductive member additional to the metallic cables of the track embedded in said rubber-like material and electrically connecting the metallic parts to each other.

13. A track for self-laying track vehicles, said track comprising a flexible body structure comprising rubber-like material, metallic cables, and metallic cross-bars resiliently connected to said cables by interposed rubber-like material for engaging a relatively movable member, and an electrically conductive member additional to the metallic cables of the track embedded in said rubber-like material and helically disposed about at least one of said cables in a position to electrically connect said cross-bars to each other.

14. A track for self-laying track vehicles, said track comprising an elongate body of rubber-like material, spaced-apart metallic cables extending lengthwise of said body, metallic driving members resiliently secured to said cables at spaced-apart intervals by interposed rubber-like material, and a flexible electrical conductor helically surrounding at least one of said cables in the rubber-like material and contacting electrically with said driving members and said cables.

HAROLD GRAY.